United States Patent [19]

Yamamoto

[11] Patent Number: 4,915,484
[45] Date of Patent: Apr. 10, 1990

[54] ANAMORPHIC SINGLE LENS

[75] Inventor: Yoshiharu Yamamoto, Toyonaka, Japan

[73] Assignee: Matsushita Electric Industrial Co., Ltd., Osaka, Japan

[21] Appl. No.: 178,343

[22] Filed: Apr. 6, 1988

[30] Foreign Application Priority Data

Apr. 6, 1987 [JP] Japan .................................. 62-84003
Oct. 23, 1987 [JP] Japan .................................. 62-268627

[51] Int. Cl.⁴ ........................ G02B 13/08; G02B 26/10
[52] U.S. Cl. .................................... 350/420; 350/6.1; 350/6.8
[58] Field of Search ................... 350/420, 6.8, 6.1

[56] References Cited

U.S. PATENT DOCUMENTS 4,756,584  7/1988  Takanashi .......................... 350/420

FOREIGN PATENT DOCUMENTS 56-36622   4/1981  Japan .
57-144515  9/1982  Japan .
60-159818  8/1985  Japan .
60-175018  9/1985  Japan .
60-191223  9/1985  Japan .
61-254915 11/1986  Japan .

Primary Examiner—Scott J. Sugarman
Attorney, Agent, or Firm—Wenderoth, Lind & Ponack

[57] ABSTRACT

An optical system for a laser beam printer uses, as a first image forming system, an anamorphic lens whose first surface facing a light source has a refraction power rotation-symmetrical with respect to the optical axis, and whose second surface is a toric surface having refraction powers different in horizontal and vertical directions. A coupling optical system for an optical disk information recording apparatus comprises an anamorphic single lens whose first surface is a toric surface correcting aberration only in a first direction in which radiation angle of a light beam emitted from a light source is larger than that in a second direction perpendicular to the first direction, and whose second surface is a toric surface correctly aberration only in the second direction.

14 Claims, 7 Drawing Sheets

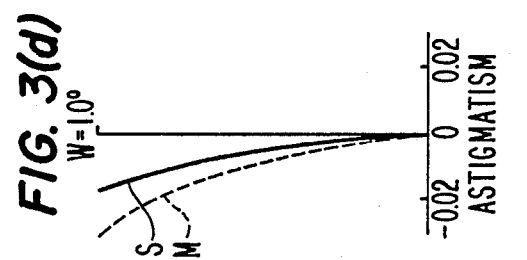
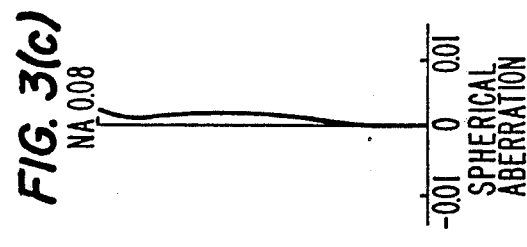
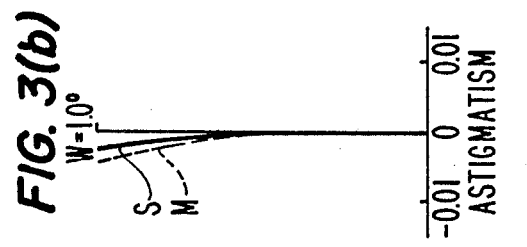
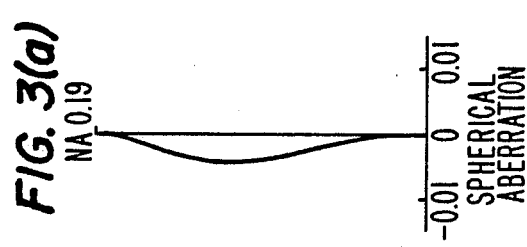
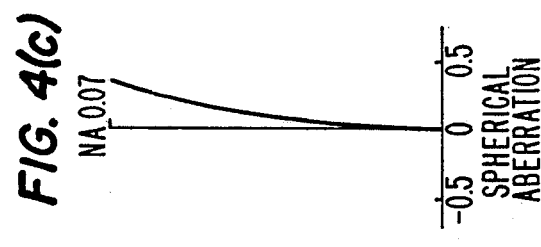
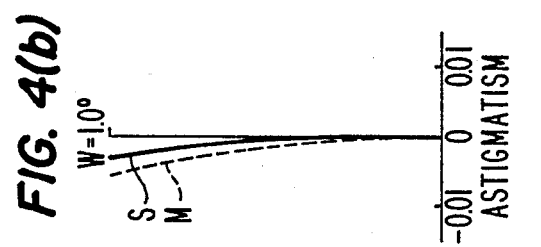
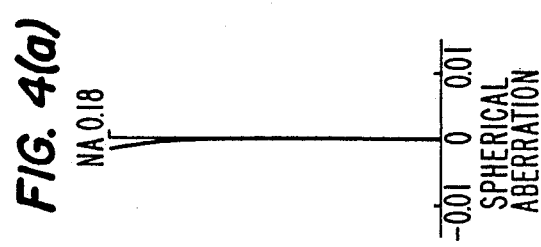

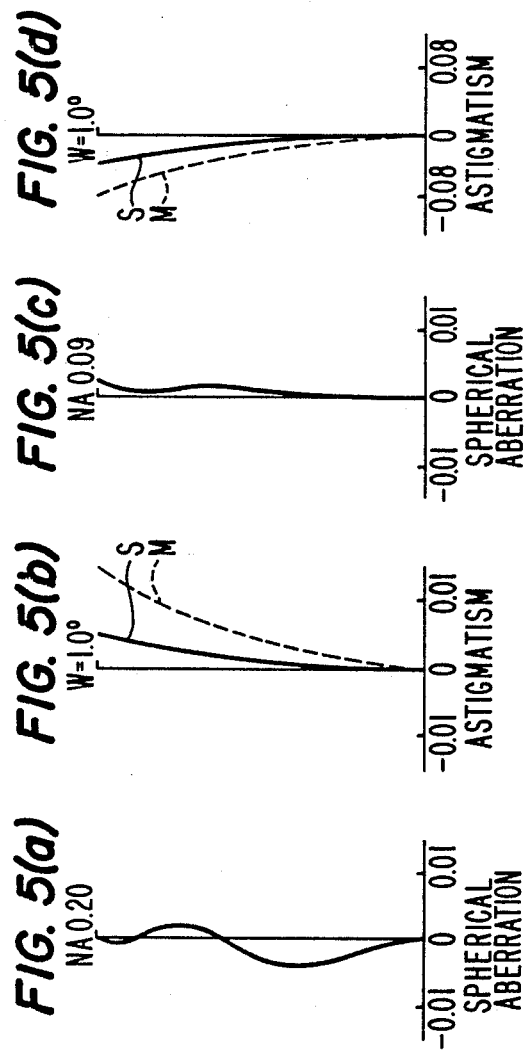
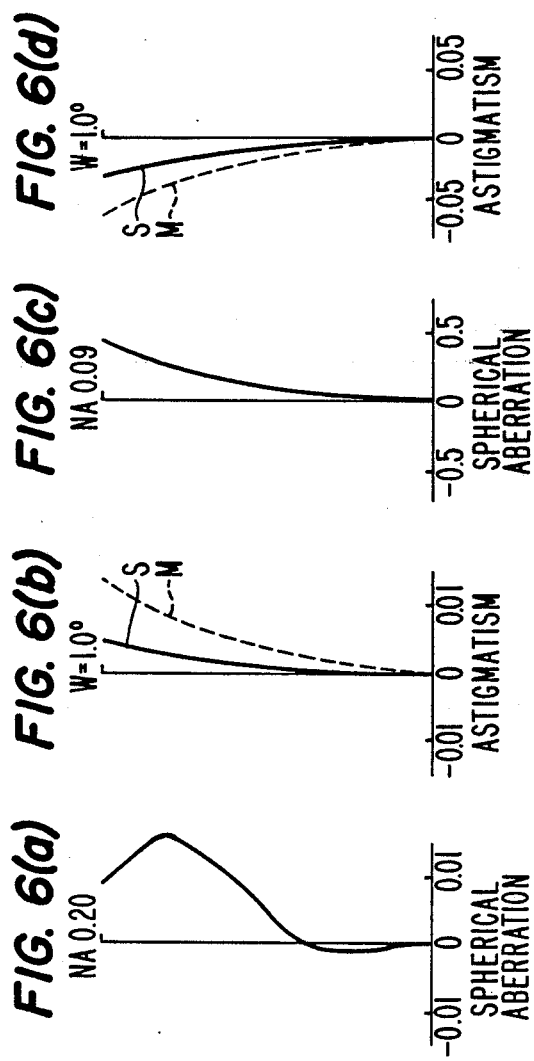

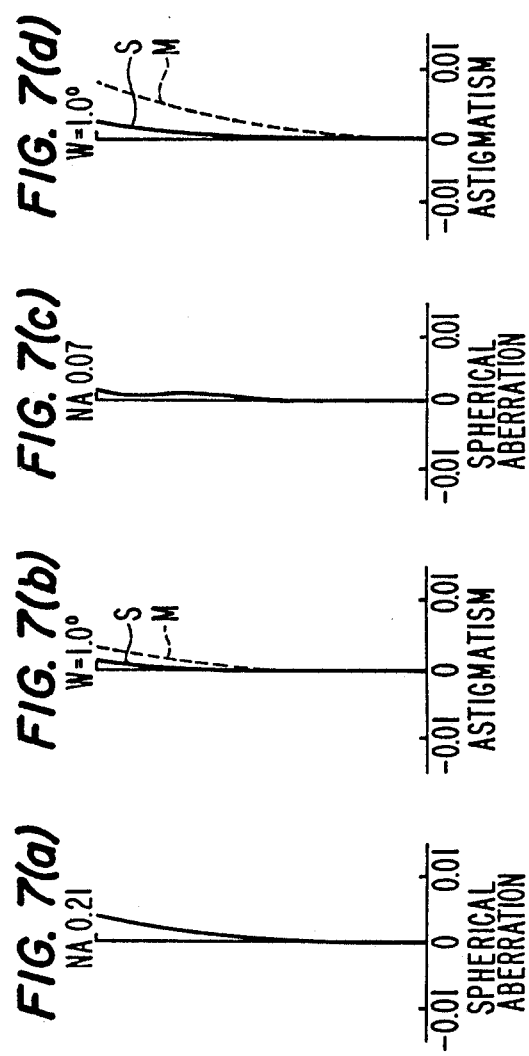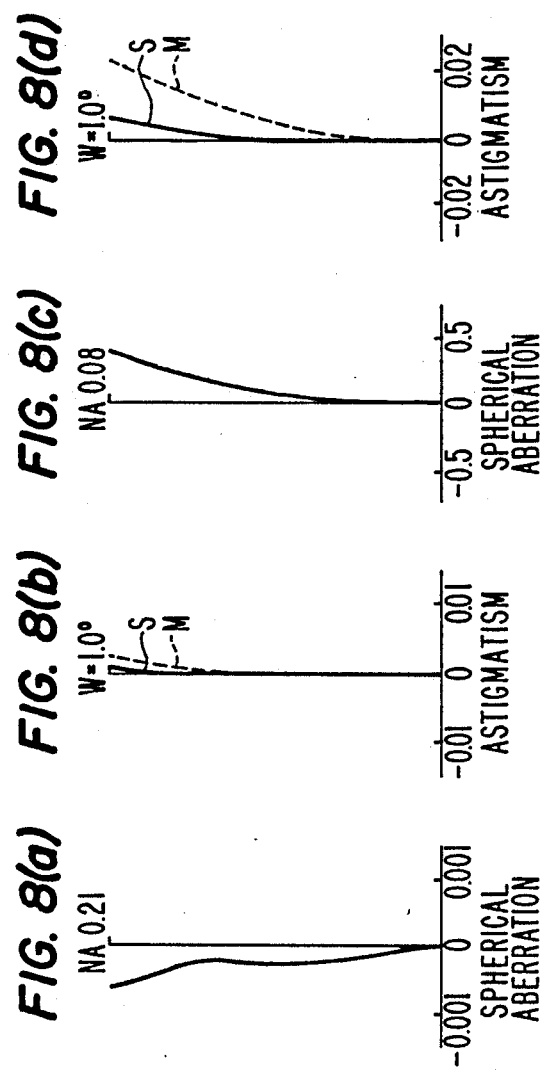

ANAMORPHIC SINGLE LENS

BACKGROUND OF THE INVENTION

1. Field of the Invention

The present invention relates to an anamorphic single lens having refracting powers different in the horizontal direction and the vertical direction, which is suitable for laser-applied optical systems in which a light source, e.g. a semiconductor laser or the like, is used.

2. Related Art

Conventionally, in a diffraction limited optical system used for a laser printer, a laser beam is focused to obtain a light spot. Recently, as a light source, a small, light-weight laser diode having an advantage in that the intensity of output light can be directly modulated has frequently been used. However, the structure of the laser diode is such that the radiation angle of the radiated beam is not rotation-symmetrical. Namely, the radiation angle in the vertical direction which is in parallel with the conjunction plane of the semiconductor device and the radiation angle perpendicular to the conjunction plane are different from each other.

FIG. 13 is an illustration which depicts an example of a radiated beam emitted from a laser diode. A light beam emitted from an emission region 3 formed between conjunction planes 2 of a laser 1 has radiation angles $\theta_2$ and $\theta_1$ in the vertical direction parallel with the conjunction planes and in the horizontal direction perpendicular to the same, respectively, which have a relationship expressed as $\theta_1 = 2\theta_2$ to $3\theta_2$. As a result, a far-field pattern 5 is ellipsoidal. When this radiated beam is made into a parallel light beam by means of a collimator lens, the parallel light beam is inevitably made into an ellipsoidal beam. A spot obtained by focusing such parallel beam by a scan optical system for a laser beam printer is also shaped into an ellipsoidal spot. To solve this problem, a beam shaping optical system using a prism is disclosed Patent Laid-Open Publication Nos. 60-1750185/1985, 60-191223/1985, where the beam shaping optical system converts an ellipsoidal input beam into a circular beam. The system employs a cylindrical lens or a toric lens to perform beam shaping or to also function as a collimator to obtain a circular parallel beam.

Conventionally, some deflecting systems having a deflective reflecting plane, e.g., scan systems of laser printers using a rotary polygonmirror, are known, in which uneven pitches of scanning lines on a plane to be scanned will not be produced even when a change in light beam deflectively scanned by an inclination of the deflective reflecting plane may occur in a plane perpendicular to a scanning plane. For example, optical systems disclosed in Japanese Patent Laid-Open Publication Nos. 56-36622/1981, 57-144516/1982 are configured with first and second image forming optical systems. The first image forming optical system comprises a collimator lens for collimating a laser radiation beam into a beam having an adequately collimated beam diameter, and a single flat convex cylindrical lens for forming the collimated beam into a linear image. The second image forming optical system comprises a deflecting system having a deflective reflecting plane adjacent to the linear image forming position, and a single spherical lens and a single toric lens for converting the deflected beam into a spot image on a scanned plane. In a plane perpendicular to the scanning direction, the deflective reflecting plane and the scanned plane are in a geometric optical conjugate relation and optically compensate the inclination of the deflective reflecting plane, thereby compensating the uneven pitches of the scan lines.

However, the first image forming optical system, which must be configured with a collimator lens and a cylindrical lens, becomes complicated in configuration and requires a long time for adjustment.

On the other hand, an optical system for an optical disk information recording apparatus is also a diffraction limited system to form a laser beam into a very small spot on a recording plane of an optical recording disk. However, when a laser diode is used as a light source, a rotation-symmetrical radiation beam cannot be obtained as described before. Accordingly, to obtain a collimated beam having a circular cross-section, the conventional system uses a collimator lens having a sufficiently small numerical aperture compared to the beam radiation angle. However, since this method is low in efficiency of light utilization, a large power laser diode must be used, resulting in the increase of cost. To solve this problem, there are known methods of using a coupling optical system which uses a cylindrical lens or uses prisms in combination with a collimator lens. An example is shown in FIG. 14, in which a radiation beam 4 emitted from a laser diode 1 is made into a substantially parallel beam by means of a collimator lens 26, and the diameter of the beam is enlarged merely in one direction by means of prisms 24, 25, whereby a desired circular beam is obtained. This system can improve the light utilization efficiency in comparison to the former method, but is complicated in configuration.

Japanese Patent Laid-Open Publication No. 61-254915/1986 discloses a system which performs these optical functions as described formerly and has a simple configuration. However, this system has too large a quantity of residual spherical aberration or the like to be practically used, because the lens plane used therein is a toric plane of, i.e., an anamorphic lens plane which is configured with arcs expressed only by the curvature radii.

SUMMARY OF THE INVENTION

An object of the present invention is to configure a first image-forming optical system of a scan optical system for a laser printer with a single lens.

Another object is to configure the coupling optical system used for an optical system of an optical disk information recording apparatus and the like with a single lens.

In order to achieve the above-described object, the first image-forming optical system of an optical scan system for a laser beam printer according to the present invention is configured only with an anamorphic single lens having an anamorphic surface. This anamorphic single lens has a first surface at a side facing a light source which emits a divergent light beam, and a second surface at opposite side to the first surface side. The first surface has a refracting power rotation-symmetrical with respect to the optical axis of the lens. The second surface has different refracting powers in the horizontal direction and vertical direction. The optical scan system is greatly simplified in configuration, facilitated with easy adjustment, and reduced in size.

A coupling optical system used for an optical disk information recording apparatus and the like is configured with a bi-anamorphic surface single lens having two anamorphic planes at both sides thereof. A light source emits a divergent light ray having different radiation angles in different directions. A first surface facing the light source is an anamorphic lens surface, e.g., a toric surface having expansion terms of fourth order and of higher orders than the fourth order, which contribute to correction of aberration of light ray in the directions of larger radiation angle. A second surface is a toric surface having expansion terms of fourth order and of higher orders than fourth order, which contribute to correction of aberration of light ray in the direction of smaller radiation angle. Moreover, the following conditions 1, 2 are preferably satisfied:

$$1.7 < n_1 \qquad (1)$$

$$1.0 < d_1/f \qquad (2)$$

where $n_1$: refractive index
$d_1$: thickness at the center of the lens
f: focal length of the lens in the direction of larger radiation angle.

By virtue of the above-described configuration, while realizing a reduction of residual abberation, the lens can be produced with a small tolerance. Thus, the optical system can be simplified and facilitated with easy adjustment, and the entire optical system can be reduced in cost and size.

BRIEF DESCRIPTION OF THE DRAWINGS

FIGS. 3(a)–3(d), 4(a)–4(d), 5(a)–5(d), 6(a)–6(d) 7(a)–7(d) and 8(a)–8(d) are respective characteristic diagrams of the first embodiment to a sixth embodiment according to the present invention;

DESCRIPTION OF THE PREFERRED EMBODIMENTS

Figure 1:
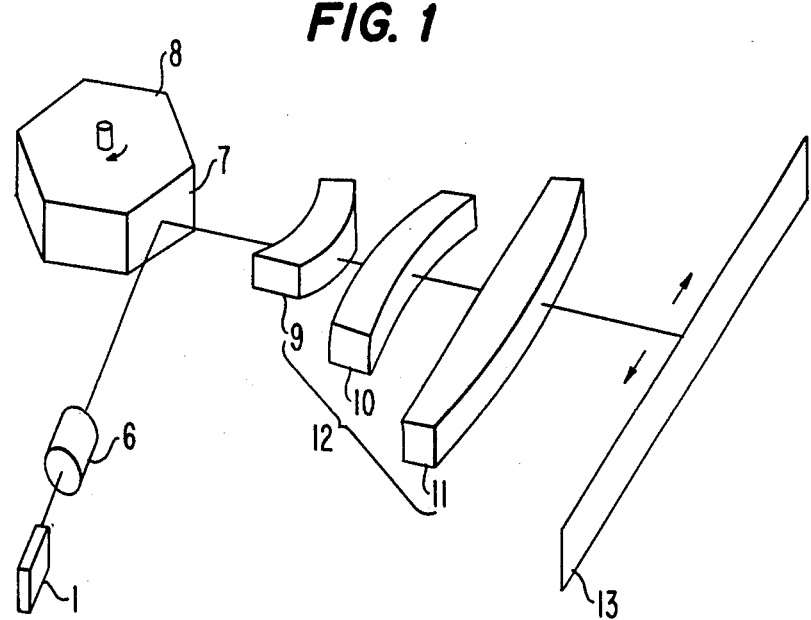
FIG. 1. is a perspective view of an optical scan system for a laser beam printer using a single lens having an anamorphic surface according to one embodiment of the present invention, which schematically shows a configuration of the system.

An anamorphic single lens having an anamorphic surface on one side thereof according to the present invention will be described in detail with reference to the accompanying drawings FIG. 1 schematically shows perspective view of a configuration of an optical scan system for a laser beam printer using a single lens 6 having an anamorphic surface on one side thereof according to the present invention, A divergent radiation beam emitted from a light source, i.e., a laser diode 1, is formed into a linear image in the scan direction adjacent to a deflective reflecting plane 7 by means of a first image-forming optical system which comprises an anamorphic lens 6 having a first surface and a second surface in the order from the light source end. The first surface has a rotation-symmetrical refracting power and the second surface has refracting powers different in the horizontal direction and vertical direction. The deflective reflecting plane 7 is one of a plurality of deflective reflecting planes formed around a rotary polygonmirror 8 which is rotatably driven by a motor (not shown) or the like for deflecting the beam. The beam deflected by the deflective reflecting plane 7 forms a scan spot on a plane 13 to be scanned, by means of a second image-forming optical system 12 comprising two spherical lenses 9, 10, and a toric lens 11.

Figure 2A:
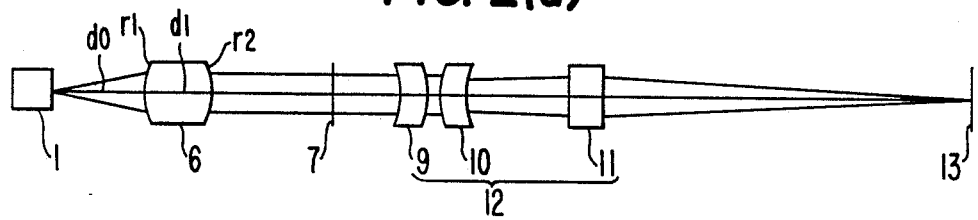
FIGS. 2 (a) and (b) schematically show respective diagrams of an arrangement of lenses and light rays in a plane in the horizontal direction and an arrangement of lenses and light rays in a plane in the vertical direction of the FIG. 1 embodiment.
Figure 2B:
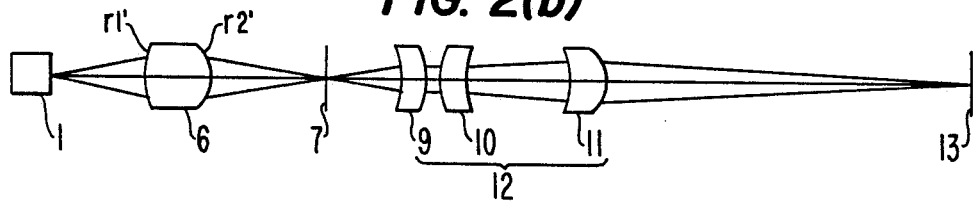

FIGS. 2 (a) and (b) schematically show respective diagrams of an arrangement of lenses and light rays in the scan plane, i.e., in a plane in the horizontal direction, and an arrangement of lenses and light rays in a plane perpendicular to the scan direction, i.e., a plane in the vertical direction. As shown in FIG. 2 (b), the deflective reflecting plane 7 and the plane 13 to be scanned are geometric optical conjugate relation in the vertical plane with respect to the second image-forming optical system, thus having a compensating function for plane inclination of the deflective reflecting plane. In the first image-forming optical system, the same functions as those of the conventional system can be realized only with a single lens in the present invention.

A larger optical power in the direction perpendicular to the scan direction of the second image-forming optical system than that in the deflecting direction is inevitably required so as to provide a compensating function for plane inclination. This causes a residual under-corrected spherical aberration in the direction perpendicular to the scan direction. However, the anamorphic lens according to the present invention used in the first optical system can be made to produce an over-corrected spherical aberration in the vertical direction, which cancels the residual aberration in the second image-forming optical system. Thus, the aberration of the entire system can be satisfactorily compensated. This can be achieved by shaping the first and second surfaces of the anamorphic lens to be aspherical.

An anamorphic lens having an anamorphic surface on one side thereof according to the present invention is preferably produced by a molding method. From the aspect of material stability, the lens is preferably made of glass material with a molding method. For examining the shape of a lens, the interference method or the three-dimensional measuring using mechanical contact or the like can be employed. In general, an examination of the shape can be easily and accurately performed when the surface is rotation-symmetrical. Therefore, in the present invention, the first surface is in a rotation-symmetrical, aspherical shape so that the accuracy of the shape of the second surface can be presumed from that of the first surface. Because of this, the second surface is preferably an anamorphic surface, i.e., a toric surface, which provides anisotropic refracting power and arbitrary compensation for aberration.

Detailed data on lenses of preferred embodiments will be described below, in which,

| $r_1, r_2$: | curvature radii with respect to refraction in planes in the horizontal direction |
| --- | --- |
| $r_1', r_2'$: | curvature radii with respect to refraction in planes in the vertical direction |
| $d_0$: | distance between the laser diode and the first surface of the lens |
| $d_1$: | lens thickness |
| $n_1$: | refractive index at a wave length 790 nm |

The rotation-symmetrical first surface has a shape whose sag from the optical axis to a radial length P is represented by the expression (3) shown below, where
K: conic constant
AD, AE, AF, AG: aspherical coefficients $$Sag = \frac{\frac{P^2}{r}}{1 + \sqrt{1 - (1+K)\left(\frac{P}{r}\right)^2}} + AD \cdot P^4 + AE \cdot P^6 + AF \cdot P^8 + AG \cdot P^{10} \quad (3)$$

When the horizontal direction is Y axis and the vertical direction is X axis, the second surface has a shape whose sag is shown by the following expression (4), where K is conic constant, and A, B, C, D, are high-order coefficients.

$$Sag = r_2 - \{r_2 - f(x)\} \cdot [1 - y^2 r_2 - f(x)^2]^{\frac{1}{2}} \quad (4)$$

where $$f(x) = \frac{\frac{X^2}{r_2'}}{1 + \left\{1 - (1+K)\left(\frac{X}{r_2'}\right)^2\right\}^{\frac{1}{2}}} + A \cdot X^4 + B \cdot X^6 + C \cdot X^8 + D \cdot X^{10}$$

The first embodiment

NA at the light source side in the horizontal direction: 0.19
NA at the light source side in the vertical direction: 0.08

$d_0 = 11.63$
$r_1 = 19.758$  $r_1' = 19.758$  $d_1 = 5.01$
$n_1 = 1.674511$  $r_2 = -15.027$  $r_2' = -8.743$
Aspherical coefficients of the first surface
$K = -5.14342$  $AD = -1.56431 \times 10^{-4}$
$AE = -2.57394 \times 10^{-6}$  $AF = 3.40523 \times 10^{-7}$
$AG = 1.48943 \times 10^{-9}$
High-order coefficients of the second surface
$K = -4.97130 \times 10^{-1}$  $A = 9.95328 \times 10^{-5}$
$B = -1.29299 \times 10^{-6}$  $C = -6.8361 \times 10^{-6}$
$D = 4.01836 \times 10^{-6}$ The second embodiment NA at the light source side in the horizontal direction: 0.18
NA at the light source side in the vertical direction: 0.07

$d_0 = 12.00$
$r_1 = 22.713$  $r_1' = 22.713$  $d_1 = 5.01$
$n_1 = 1.674511$  $r_2 = -14.599$  $r_2' = -8.596$
Aspherical coefficients of the first surface
$K = -5.02486$  $AD = -1.63110 \times 10^{-4}$
$AE = 3.93985 \times 10^{-7}$  $AF = 3.22836 \times 10^{-7}$
$AG = -2.51099 \times 10^{-8}$
High-order coefficients of the second surface
$K = -8.83026 \times 10^{-1}$  $A = 1.80506 \times 10^{-4}$
$B = 3.93637 \times 10^{-5}$  $C = -8.66376 \times 10^{-6}$
$D = -2.30165 \times 10^{-5}$ The third embodiment NA at the light source side in the horizontal direction: 0.20
NA at the light source side in the vertical direction: 0.09

$d_0 = 15.54$
$r_1 = 7.396$  $r_1' = 7.396$  $d_1 = 12.78$
$n_1 = 1.674511$  $r_2 = 19.976$  $r_2' = 198.061$
Aspherical coefficients of the first surface
$K = -7.18123 \times 10^{-1}$  $AD = -3.09738 \times 10^{-4}$
$AE = -1.75756 \times 10^{-6}$  $AF = 4.13063 \times 10^{-7}$
$AG = -1.66323 \times 10^{-8}$
High-order coefficients of the second surface
$K = -1.53169 \times 10^{3}$  $A = 6.10929 \times 10^{-5}$
$B = -1.01003 \times 10^{-5}$  $C = -4.43366 \times 10^{-6}$
$D = 2.55022 \times 10^{-6}$ The fourth embodiment NA at the light source side in the horizontal direction: 0.20
NA at the light source side in the vertical direction: 0.09

$d_0 = 15.60$
$r_1 = 7.402$  $r_1' = 7.402$  $d_1 = 12.78$
$n_1 = 1.674511$  $r_2 = 19.829$  $r_2' = 184.788$
Aspherical coefficients of the first surface
$K = -7.21344 \times 10^{-1}$  $AD = -3.10983 \times 10^{-4}$
$AE = -1.66167 \times 10^{-6}$  $AF = 4.19581 \times 10^{-7}$
$AG = -1.62427 \times 10^{-8}$
High-order coefficients of the second surface
$K = 1.04594 \times 10^{3}$  $A = 1.08706 \times 10^{-4}$
$B = 8.69370 \times 10^{-7}$  $C = -2.84467 \times 10^{-6}$
$D = 2.18071 \times 10^{-6}$ The fifth embodiment NA at the light source side in the horizontal direction: 0.21
NA at the light source side in the vertical direction: 0.07

$d_0 = 5.17$
$r_1 = -22.921$  $r_1' = -22.921$  $d_1 = 9.46$
$n_1 = 1.674511$  $r_2 = -6.838$  $r_2' = -4.866$
Aspherical coefficients of the first surface
$K = 1.58163 \times 10^{2}$  $AD = -2.45134 \times 10^{-3}$
$AE = 7.18395 \times 10^{-5}$  $AF = 7.74503 \times 10^{-5}$
$AG = -1.03536 \times 10^{-6}$
High-order coefficients of the second surface
$K = -3.2282 \times 10^{-1}$  $A = 3.4769 \times 10^{-4}$
$B = 2.5407 \times 10^{-5}$  $C = -4.0135 \times 10^{-5}$
$D = 2.3295 \times 10^{-5}$ The sixth embodiment NA at the light source side in the horizontal direction: 0.21

NA at the light source side in the vertical direction: 0.08

$d_0 = 5.16$
$r_1 = -22.922$   $r_1' = -22.922$   $d_1 = 9.46$
$n_1 = 1.674511$   $r_2 = -6.834$   $r_2' = -5.029$
Aspherical coefficients of the first surface
$K = 1.58065 \times 10^2$   $AD = -2.44918 \times 10^{-3}$
$AE = 6.80158 \times 10^{-5}$   $AF = 8.07208 \times 10^{-5}$
$AG = 1.24426 \times 10^{-6}$
High-order coefficients of the second surface
$K = -4.21922 \times 10^{-1}$   $A = 4.64443 \times 10^{-4}$
$B = 1.75464 \times 10^{-5}$   $C = -1.23251 \times 10^{-4}$
$D = 6.08908 \times 10^{-5}$ FIGS. 3 to 8 depict characteristics of the first through sixth embodiments, respectively. In each of FIGS. 3 to 8, (a) denotes spherical aberration in the horizontal direction, (b) astigmatism in the horizontal direction, (c) spherical aberration in the vertical direction, and (d) astigmatism in the vertical direction. As is obvious from the figures, the spherical aberration in the vertical direction is over-corrected in the second, fourth and sixth embodiments in order to cancel the remaining spherical aberration in the second image-forming optical system, as have been described formerly.

Now, an anamorphic single lens having anamorphic surfaces on both sides thereof, i.e. a bi-anamorphic surface single lens, will be described in detail according to one embodiment of the present invention.

Figure 9A:
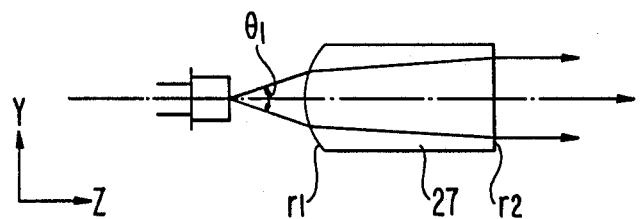
FIGS. 9 (a) and (b) are schematic diagrams showing a concept of a bi-anamorphic surface single lens having two anamorphic, surfaces according to the present invention.
Figure 9B:
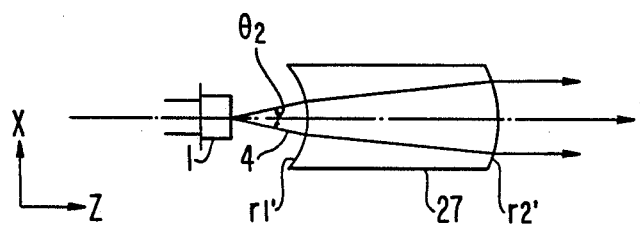

In FIG. 9 (a), the direction of a large radiation angle $\theta_1$ of a semiconductor laser 1 is shown as the horizontal direction and, in FIG. 9 (b), the direction of a small radiation angle $\theta_2$ of the same is shown as the vertical direction. Radiation beam 4 is refracted by an anamorphic single lens 27 having two anamorphic surfaces on both sides thereof according to the present invention. A light ray having a substantially parallel, circular cross-section can be obtained from the second surface of the anamorphic single lens 27 under the condition that the refracting power in the horizontal direction is enhanced to be two to three times as large as that in the vertical direction, the front focuses in the two directions are substantially the same; and the laser diode 1 is positioned at the front focal point.

To satisfy such condition, both the first and second surfaces are anamorphic lens surfaces, i.e., toric surfaces, curvature radii contributing to the refraction in the horizontal direction are in the order of $r_1$ and $r_2$ from the light source end, and curvature radii contributing to the refraction in the vertical direction are in the order of $r_1'$ and $r_2'$ from the light source end. For using the lens in a refraction limited optical system, it is necessary to correct aberration, especially spherical aberration. In case of a lens system which is rotation symmetrical with respect to the optical axis, aberration can be easily corrected by introducing an aspherical surface. However, when each surface needs to contribute to correction of aberration both in the horizontal and vertical directions as in the case of the lens of the present invention having toric surfaces, free curve surfaces must be provided. But, production of a free curve surface with high accuracy is very difficult and impractical.

Therefore, according to the present invention, to realize a lens which can sufficiently compensate aberration and can be easily produced, the first surface is a toric surface having higher order expansion terms than third order for contributing to correction of aberration only for the light ray in the horizontal direction, i.e., the direction of the larger radiation angle as shown in FIG. 9 (a). The second surface is an anamorphic lens surface i.e., a toric surface, having higher order expansion terms than third order for contributing to correction of aberration only for the light ray in the vertical direction, i.e., the direction of the smaller radiation angle, as shown in FIG. 9 (b). Since the radiation angle in the horizontal direction is larger that in the vertical direction, the height of on-axis marginal light ray in the horizontal direction is higher than that in the vertical direction. Thus, at the first surface the aberration is more effectively corrected in the horizontal direction by the high-order terms of the expansion formula for expressing the shape of the lens surface. Therefore, at the second surface the aberration may be corrected only for the light at a sufficient height in the vertical direction by the high-order terms The expansion formula for expressing the shape of the toric surface of the first surface is expressed by an expression (5) which represents a sag from the vertex of the surface in an coordinate system X-Y-Z shown in FIGS. 9 (a) and (b). Similarly, the expression (4) represents that of the second surface.

$$Sag = r_1' - \{r_1' - f(y)\}[1 - x^2/\{(r_1' - f(y))^2\}]^{\frac{1}{2}} \quad (5)$$

where $$f(Y) = \frac{\frac{Y^2}{r_1}}{1 + \left\{1 - (1 + K)\left(\frac{Y}{r_1}\right)^2\right\}^{\frac{1}{2}}} + \quad (6)$$

$$A \cdot Y^4 + B \cdot Y^6 + C \cdot Y^8 + D \cdot Y^{10}$$

where
K: conic constant
A, B, C, D: high-order coefficients

The following conditions (1) and (2) are preferably satisfied so as to minimize the residual aberration, increase tolerance, and easen production.

$$1.71 < n_l \quad (1)$$

$$1.0 < d_1/f \quad (2)$$

where
$n_1$: refractive index
$d_1$: thickness at the center of the lens
f: focal length of the lens in the horizontal direction in which the radiation angle of the beam emitted from the light source is larger.

The condition (1) relates to the refractive index of the bi-anamorphic surface single lens. When the condition (1) is exceeded, the curvature of each surface becomes too large to adequately correct coma aberration by the high-order expansion terms, resulting in deterioration of the off-axis characteristics. Hence, the optical axis of the anamorphic single lens and that of the laser diode must be accurately positioned, which causes difficulty in assembling and adjusting the system. Further, the machining tolerance is reduced in addition to the large curvature, causing difficulty in production of the lens.

The condition (2) relates to the center thickness and focal length in the horizontal direction of the bi-anamorphic surface single lens. When the condition (2) is exceeded, the difference between the curvature radii $r_1$ and $r_1'$ of the first surface becomes too large to properly correct the coma aberration, resulting in deterioration of the off-axis characteristics and reduction of the total view-angle. Thus, assembly and adjustment of the system become difficult.

Figure 10:
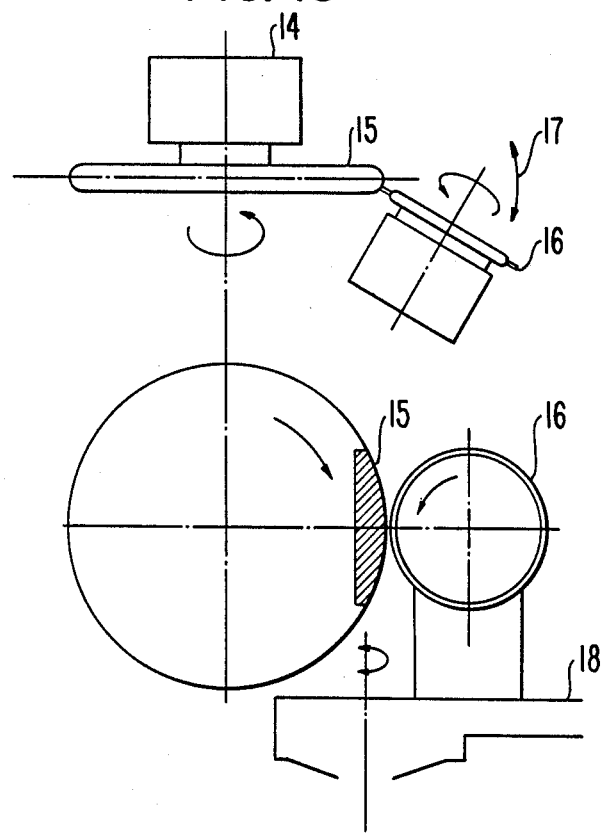
FIG. 10 is a diagram showing a method of producing the surface of an anamorphic single lens.

The anamorphic single lens according to the present invention can be easily machined in the following way. FIG. 10 shows the concept of machining the lens. An object 15 to be machined into an anamorphic single lens, fixed to a rotary spindle 14 is shaped into a desired shape with a rotary grinder 16 which moves on a locus corresponding to the expressions (4) and (5), as shown by an arrow 17. According to this method, the machining can be performed only by placing the rotary grinder on a bed 18 for fixing a cutting tool on a normal CNC lathe.

The data of the seventh to tenth embodiments, which are the bi-anamorphic surface single lenses, according to the present invention will be described below, where:
$n_1$: refractive index at wave length 780 nm
$d_1$: thickness of the lens The first surface is a toric surface having higher order expansion terms than third order for correcting aberration only for the light ray in the horizontal direction, and the second surface is a toric surface having higher order expansion terms than third order for correcting abberation only for the light ray in the vertical direction.

In each embodiment, the aberration is corrected presuming that a cover glass (refraction index: 1.50, thickness: 0.30) of the laser diode is inserted in the optical path.

The seventh embodiment $r_1 = 6.838$   $r'_1 = -2.601$   $d_1 = 9.00$   $n_1 = 1.785691$
$r_2 = -70.809$   $r_2' = -5.792$
Conic constant and high-order coefficients of the first surface
$K = -3.73437$   $A = 6.24135 \times 10^{-6}$   $B = -1.08708 \times 10^{-6}$
$C = -2.25823 \times 10^{-7}$   $D = 2.79497 \times 10^{-8}$
Conic constant and high-order coefficients of the second surface
$K = -3.12183 \times 10^{-1}$   $A = 1.01080 \times 10^{-7}$   $B = -4.58117 \times 10^{-8}$
$C = 1.02639 \times 10^{-8}$   $D = -7.41055 \times 10^{-10}$
Entrance NA in the horizontal direction: 0.3
Entrance NA in the vertical direction: 0.1
$d_1/f$: 1.076

The eighth embodiment $r_1 = 9.100$   $r'_1 = -3.652$   $d_1 = 14.00$   $n_1 = 1.785691$
$r_2 = -28.054$   $r_2' = -8.489$
Conic constant and high-order coefficients of the first surface
$K = -5.18542$   $A = -1.01733 \times 10^{-4}$   $B = 9.31221 \times 10^{-7}$
$C = -7.63955 \times 10^{-8}$   $D = 5.88252 \times 10^{-7}$
Conic constant and high-order coefficients of the second surface
$K = -3.17171 \times 10^{-1}$   $A = -1.75528 \times 10^{-7}$   $B = -4.19257 \times 10^{-8}$
$C = 4.42926 \times 10^{-10}$   $D = 4.96726 \times 10^{-11}$
Entrance NA in the horizontal direction: 0.3
Entrance NA in the vertical direction: 0.1
$d_1/f$: 1.335

The ninth embodiment $r_1 = 5.614$   $r'_1 = -3.249$   $d_1 = 18.00$   $n_1 = 1.785691$
$r_2 = -16.493$   $r_2' = -9.579$
Conic constant and high-order coefficients of the first surface
$K = -6.59307$   $A = -4.85845 \times 10^{-4}$   $B = -8.67863 \times 10^{-4}$
$C = 7.72916 \times 10^{-4}$   $D = -2.04824 \times 10^{-4}$
Conic constant and high-order coefficients of the second surface
$K = -2.96265 \times 10^{-1}$   $A = 2.35927 \times 10^{-6}$   $B = 1.16472 \times 10^{-7}$
$C = -2.34904 \times 10^{-8}$   $D = 1.73780 \times 10^{-9}$
Entrance NA in the horizontal direction: 0.3
Entrance NA in the vertical direction: 0.1
$d_1/f$: 2.167

The tenth embodiment $r_1 = 5.448$   $r'_1 = -3.315$   $d_1 = 15.00$   $n_1 = 1.712303$
$r_2 = -19.000$   $r_2' = -8.014$
Conic constant and high-order coefficients of the first surface
$K = -3.54418$   $A = 7.20709 \times 10^{-5}$   $B = -2.13008 \times 10^{-3}$
$C = 1.17033 \times 10^{-3}$   $D = -1.88339 \times 10^{-4}$
Conic constant and high-order coefficients of the second surface
$K = -3.06413 \times 10^{-1}$   $A = 7.59880 \times 10^{-6}$   $B = 4.98553 \times 10^{-7}$
$C = -7.20953 \times 10^{-8}$   $D = 4.60781 \times 10^{-9}$
Entrance NA in the horizontal direction: 0.3
Entrance NA in the vertical direction: 0.1
$d_1/f$: 1.879

Figure 11:
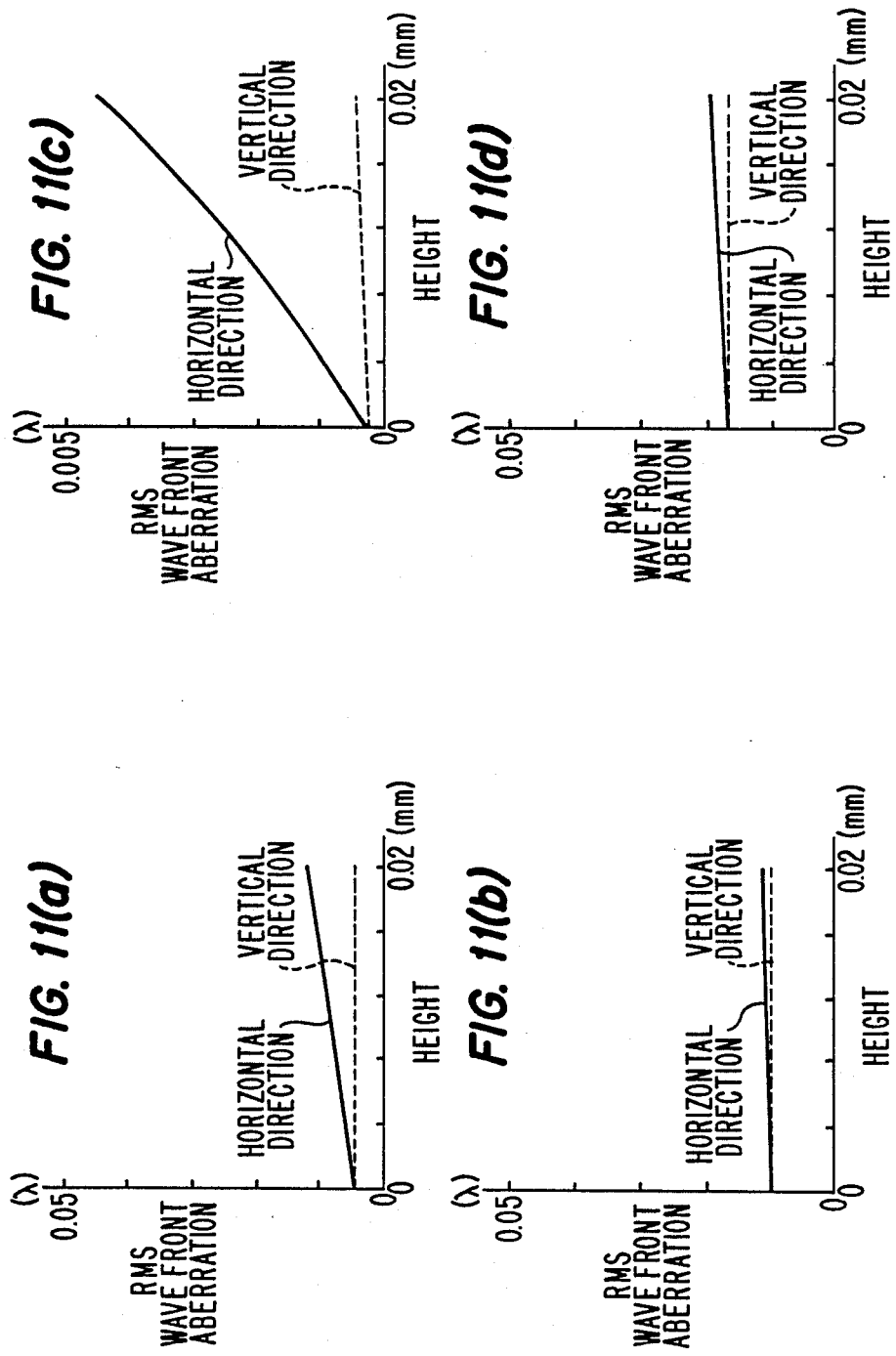
FIGS. 11 (a), (b), (c) and (d) are wave front aberration characteristic graphs showing characteristics of a seventh embodiment to a tenth embodiment according to the present invention.

FIGS. 11 (a), (b), (c) and (d) show-off-axis performance characteristics of the seventh to tenth embodiments. The vertical axis shows variance of wave front aberration and the internal axis shows off-axis quantity (height of object).

Figure 12:
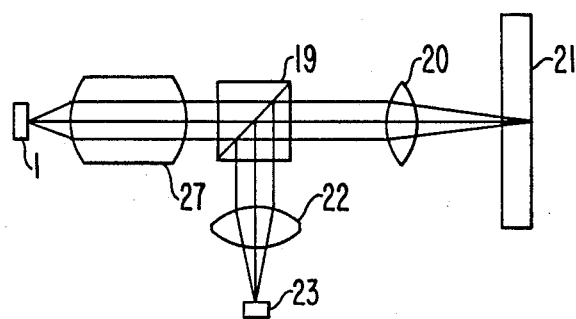
FIG. 12 is a block diagram of an optical system for an optical disk information recording apparatus using a bi-anamorphic surface single lens according to the present invention.
Figure 13:
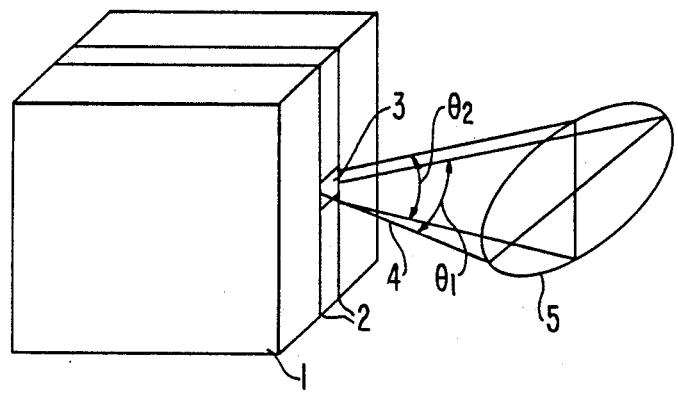
FIG. 13 is a perspective view showing a state of a radiation beam which is emitted from a semiconductor laser.
Figure 14:
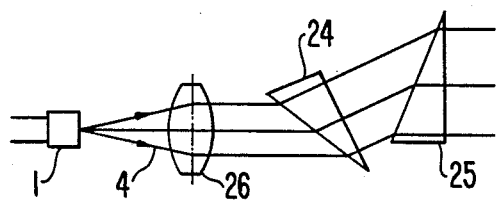
FIG. 14 shows a configuration of a conventional coupling optical system.

FIG. 12 is a schematic block diagram of an optical system for an optical disk information recording apparatus which uses a bi-anamorphic surface single lens. In this Figure, a beam emitted from a laser diode 1 is converted into a substantially parallel, substantially circular beam by a bi-anamorphic surface single lens 27, and is focused onto an optical disk 21 by way of a beam splitter 19 and an object lens 20. A reflected beam from the optical disk 21 is received by a photo detector 23 by way of the object lens 20, the beam splitter 19 and a detection lens 22.

What is claimed is:
1. An anamorphic single lens, comprising:
   a single lens body having surface means comprising first and second surfaces at opposite sides of said lens body for refracting a divergent light beam emitted from a light source facing said first surface into a linear image;
   said first surface having a refraction power rotation-symmetrical with respect to the optical axis of said lens body; and
   said second surface having different refraction powers in respective first and second directions, wherein said first direction is perpendicular to said second direction, and both said first and second directions are perpendicular to said optical axis, thereby refracting a light beam differently in said first direction than in said second direction.

2. An anamorphic single lens as set forth in claim 1, wherein:
   said first surface is an aspherical surface having a shape rotation-symmetrical with respect to said optical axis of said lens body.

3. An anamorphic single lens as set forth in claim 1, wherein:
   said second surface is a toric surface expressed by an expansion formula having fourth and higher order expansion terms contributing to correction of aberration only in said second direction for a light beam emitted from the light source having a radiation angle smaller in said second direction that in said first direction.

4. An anamorphic single lens as set forth in claim 1 wherein said lens body is a glass lens body.

5. An anamorphic single lens body as set forth in claim 1, wherein said lens body is a molded glass lens body.

6. An anamorphic single lens, comprising:
a single lens body having surface means comprising first and second surfaces at opposite sides thereof for refracting a divergent light beam emitted from a light source facing said first surface into a parallel light beam, said surface means refracting the light beam differently in first and second directions, said first direction perpendicular to said second direction, and both said first and second directions perpendicular to the optical axis of said lens body, wherein:
  (a) said first surface is a toxic surface having fourth and higher order expansion terms contributing to correction of aberration only in said first direction; and
  (b) said second surface is a toric surface having fourth and higher order expansion terms contributing to correction of aberration only in said second direction.

7. An anamorphic single lens as set forth in claim 6, wherein said lens body having said first and second surfaces substantially satisfies the conditions:

$1.71 < n_1$ $1.0 < d_1/f$ wherein $n_1$ is the refractive index of the lens, $d_1$ is the thickness of the lens at the center of said lens body, and f is the focal length of the lens in said first direction.

8. An anamorphic single lens as set forth in claim 6, and adapted for a light beam emitted from the light source which has a radiation angle larger in said first direction that in said second direction.

9. An optical scan system for scanning a scan plane with a light spot in a direction of scan, comprising:
  a light source means for emitting a divergent light beam;
  a first image forming means comprising an anamorphic single lens having first and second surfaces at opposite sides thereof for converting the divergent light beam emitted by said light source and incident on said first surface into a linear image parallel to the direction of scan, said first surface having a refraction power rotation-symmetrical with respect to the optical axis of said lens, and said second surface having a refraction power in a direction parallel to said direction of scan and a refraction power in a direction perpendicular to said direction of scan, wherein said respective refraction powers of said second surface are different from each other;
  a deflecting means having a movable deflective reflecting plane for deflecting the linear image from said first image forming means; and
  a second image forming means for converting the linear image deflected by said deflecting means into a light spot for scanning the scan plane.

10. An optical scan system as set forth in claim 9, wherein said first surface of said anamorphic single lens has an aspherical shape rotation-symmetrical with respect to said optical axis of said lens.

11. An optical scan system according to claim 9, wherein said second surface of said anamorphic single lens is a toric surface having fourth and higher order expansion terms contributing to correction of aberration only in a direction in which the radiation angle of a light beam from the light source is smaller than the radiation angle of the light beam in another direction.

12. An optical system for an optical disk direction recording apparatus that uses an optical disk as an information recording medium, said optical system comprising:
  a light source means for emitting a divergent light beam such that the light beam has a first radiation angle in a first direction different from a second radiation angle in a second direction perpendicular to said first direction;
  an anamorphic single lens having first and second toric surface at opposite sides thereof for converting the light beam emitted from said light source and incident on said first toric surface into a substantially parallel, circular light beam, said first toric surface having fourth and higher order expansion terms contributing to correction of aberration only in said first direction, and said second toric surface having fourth and higher order expansion terms contributing to correction of aberration only in said second direction;
  a means for focusing the light beam from said anamorphic single lens onto an optical disk and converging a reflected light beam from the optical disk; and
  a means for receiving the converged reflected light beam.

13. An optical system as set forth in claim 12, wherein said anamorphic single lens substantially satisfies the conditions:

$1.71 < n_1$ $1.0 < d_1/f$ where $n_1$ is the refractive index of said anamorphic lens, $d_1$ is the thickness of said lens at its center, and f is the focal length of said lens in said first direction.

14. An optical system as set forth in claim 12, wherein said first radiation angle is larger than said second radiation angle.

* * * * *